W. E. ROBERTSON.
RESILIENT WHEEL.
APPLICATION FILED AUG. 13, 1914.
1,254,278.
Patented Jan. 22, 1918.
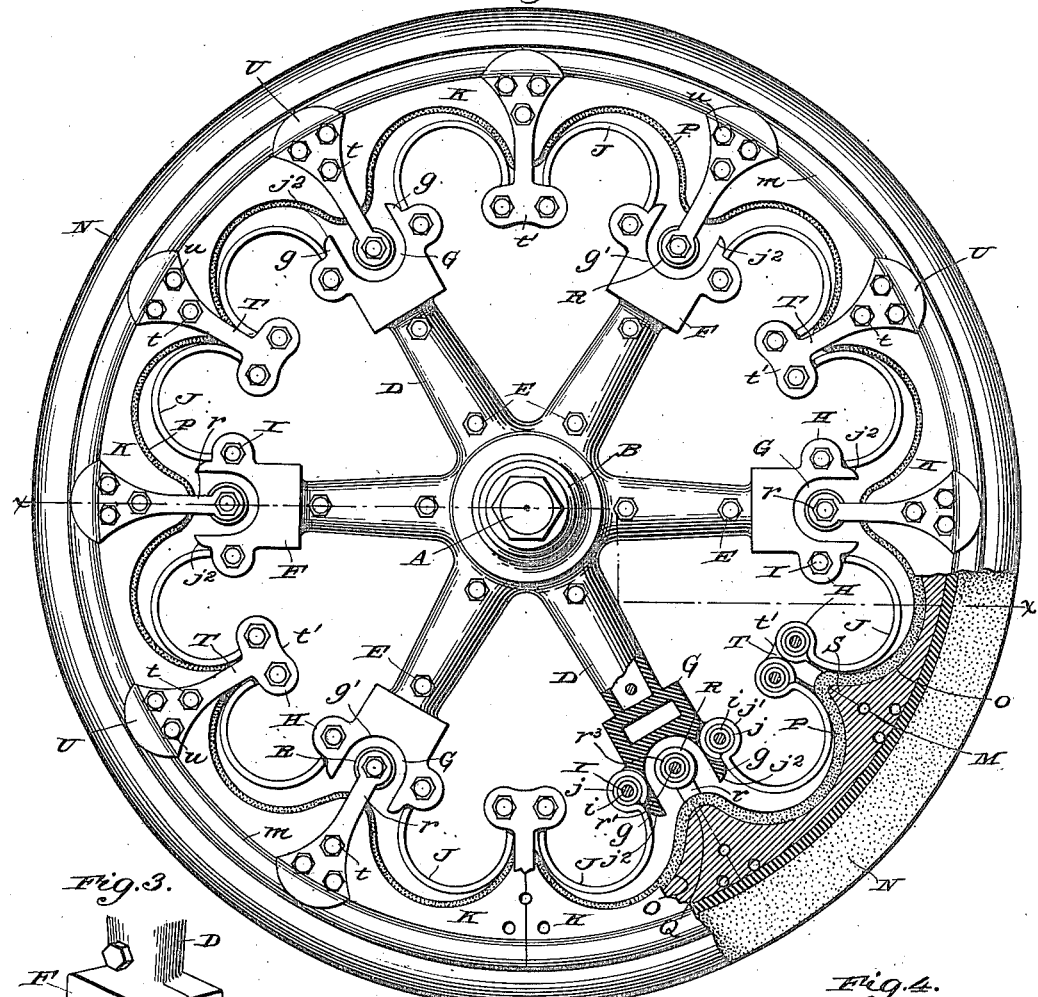
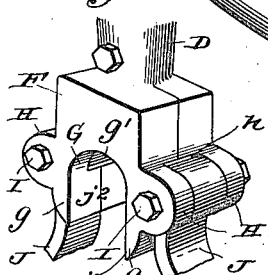
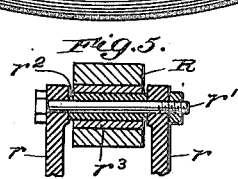
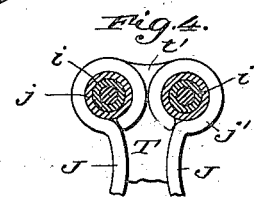
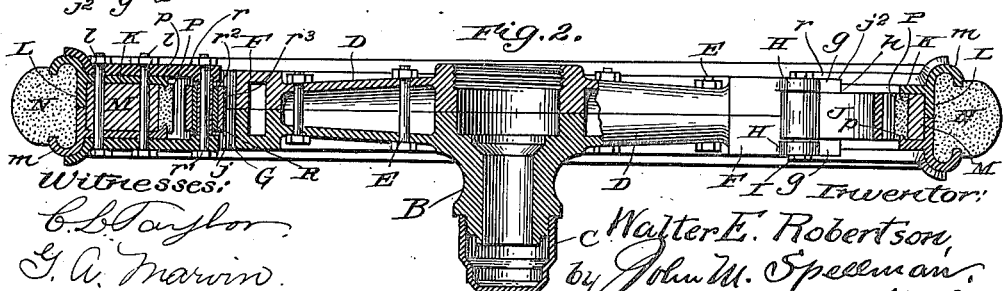
Witnesses:
Inventor:
Walter E. Robertson,
by John M. Spellman,
Attys.

UNITED STATES PATENT OFFICE.

WALTER E. ROBERTSON, OF VENUS, TEXAS.

RESILIENT WHEEL.

1,254,278.  Specification of Letters Patent.  Patented Jan. 22, 1918.

Application filed August 13, 1914. Serial No. 856,561.

*To all whom it may concern:*

Be it known that I, WALTER E. ROBERTSON, citizen of the United States, residing at Venus, in the county of Johnson and State of Texas, have invented certain new and useful Improvements in Resilient Wheels, of which the following is a specification.

The present invention relates to improvements in resilient wheels, and has for its primary object the provision of a wheel of the character stated, and wherein the yieldable or adjustable, shock-absorbing and cushioning elements are located remote from the hub, or specifically within a rigid rim portion of the wheel, to the end that the wheel-bearing and rigid spokes radiating therefrom may remain at all times inherently relatively fixed or non-yielding elements, with respect to which the rim—within which the outer ends of the said spokes are elastically suspended,—may bodily yield under the varying conditions incident to road travel to distribute and absorb throughout the rim circumferentially thereof, the shocks flowing from undulating surfaces or obstructions encountered by the periphery of the wheel. In this manner, the axle and fixed spokes may move substantially continuously through a plane paralleling the road surface, and in what might well be said to be a floating condition within the self-adjusting rim surrounding said rigid spokes.

The development of what is known as the "spring-wheel" art, coupled with my personal observation and experimentation, covering a wide period of time, have demonstrated the fact that perhaps innumerable arrangements of spring-members, including spring-spokes may be utilized in a wheel to afford varying degrees of elasticity while rolling under a comparatively low speed, but many and great difficulties present themselves which must be overcome in a springwheel designed to be operated under high speeds such as must be expected of wheels employed in connection with motor vehicles. Among these difficulties are the tendencies to exert severe end thrusts longitudinally of a spring leaf or member tending to break or shear its fastening means; to create compound bending of elongated spring members, correspondingly increasing the reluctance of the spring to restore itself speedily to normal condition, and by undue bending, to crystallize and break the spring in the bending regions thereof; and to permit a too great freedom of movement of the spring so that the same violently vibrates or moves convulsively, here, again, resulting in crystallization, and causing the spring to waste its energy in correcting or righting itself to its normal expected operative association with the other wheel elements, instead of being immediately prepared to resist subsequent shocks, etc., the result of which latter is a severe conflict of forces entirely frustrating the harmonious action of the springs necessary in a field of service, such as rapidly rotating vehicle wheels.

It has been with a view to meet and overcome the foregoing objections that I have conceived the construction (and utilized the principles underlying the same) herein set forth, and which construction is, of course, merely one exemplification or embodiment of my invention, it being clear to persons skilled in the art that the invention is capable of incorporation in other forms and devices than that specifically disclosed.

The underlying idea of the specific embodiment which I have elected to illustrate, as well as others as may be in keeping with the hereto appended claims, involves, as previously stated, the use of rigid spokes, and means resiliently suspending said spokes within a bodily displaceable rim adapted to be engaged and steadied throughout and at all times by a coöperating action between the suspending means, and the interior of the rim, so that while the rim may promptly yield to accommodate obstructions, and relative depressions and elevations, in a road bed, such yield will not be a loose or tremulous movement, but will be more like a rolling action around the ends of the spokes within predetermined safety limits: and the yieldable suspension means being constituted, in part, by uniform, bowed springs, the opposite terminals of which are adapted to spread and contract to afford a progressively increasing seating engagement of the springs lengthwise thereof with adjacent portions of and in the rim, and a corresponding retraction of the springs away from such seating engagement. This action insures the rim being held by the springs at approximately all points around the rim, no matter what the nature of its displacement vertically or around the axis of the wheel, and the restoration of the rim to its initial or normal relation to the ends of the fixed spokes being in an even, gradual manner, as distinguished from a sudden or jerky movement, which latter would correspondingly transmit the effect of its awkwardness and jar to the vehicle body and occupants thereof.

My improved wheel also utilizes the principle of yieldably suspending the load within the rim in the line of and parallel to the line of the application of force applied to the rim. For example, the spring suspension is so formed, and the points of attachment of the springs so arranged, that throughout the circumference of the wheel the load is normally supported by the yieldable resistance of the springs offered in substantially truly vertical planes, or at right angles to the road surface, whereas upon the encountering of an obstruction which will change the point of application of pressure on the rim, the suspension springs will automatically act to suspend the load in planes parallel to the changed point of application of the force so that the rim is at all times, irrespective of the particular contact of exterior objects with its rim incident to the travel of the wheel, permitted to yield directly away from the obstruction, and to restore itself back to normal position without requiring the overcoming of unnecessary or prohibitive conflicting forces of springs not arranged to afford the continual parallel suspension to which I have alluded, and the combating of which latter forces or resistance so often results in the shearing of the springs, the crystallization or breaking thereof, and the impairment of their fastening devices, aside from the inconvenience and unsatisfactory results attending a too-free vibration of the wheel and incidentally the vehicle body.

Another important advantage incident to my construction is the fact that while the rim is permitted to yield in various directions around the ends of the spokes, which yield is permitted by means of the special spring suspension devices employed in the combination, any possibility of jar or shock which would flow from permitting a sharp contact of one of the structural elements with another,—particularly the spring elements,—which would carry with such action an objectionable rebound and following tremulous movement,—is absolutely prevented, because the arrangement of my springs is such as to preclude all jarring, or even possibility of the springs closing entirely together, or closing at any point with an impact either within themselves or against the parts to which they are attached, or with which they coöperate, although permitting at all times a safe and adequate rolling easy movement of the rim within an area around or over the ends of the spokes, within the rim, and through the region limited in an outward direction by a line intersecting the outermost points of suspension of the suspension springs. This prevents the springs being distorted or deflected beyond their elastic limit.

The foregoing arrangement, preventing in the wheel *per se* an undesirable shock, jar, or tremulous action, correspondingly prevents the bouncing of the wheel and incidentally the vehicle proper, upon the surface of the road when meeting with rough surface conditions or obstructions on the road surface, usually attending the use of a pneumatic tire, because the yieldability of the rim permitting it to alone adjust itself under the contact of the obstruction, practically enables the relatively sluggishly moving body of the vehicle, including its hubs and spokes, to maintain or travel in its normal plane, as over a level or smooth surface, and the weight thereof, combined with the function of the springs to restore the rims to the normally centered positions thereof around the spokes, will exert a constant pressure toward the road surface, and cause the rim to immediately return to the ground after passing the said obstruction, and to hug the ground at all times so that a practically continuous traction engagement is maintained, as distinguished from a vertical bouncing or jumping of the wheels and body, when leaving the obstruction, as heretofore stated is so customary in the case of either rigidly mounted wheels or wheels provided with pneumatic tires, or relatively unrestricted vibrating centers or points of an elastic suspension.

The forces of momentum and reaction of impact are utilized in this wheel as cushioning factors by shortening the radius between the outside of the rigid rim and inside of the center of the system, and by reason of the peculiar arrangement of the compensating members and points of suspension these two forces are permitted to pass each other without conflict.

Improved details and construction of parts will be clear from the more specific description hereinafter contained, when read in connection with the accompanying drawings forming part hereof, and wherein the preferred embodiment of the invention is illustrated.

In the drawings,

Figure 1 is a side elevation of a wheel, parts being shown in section, made in keeping with my invention, Fig. 2 is a cross sectional view on the line x—x of Fig. 1, Fig. 3 is a perspective view of the outer end of one of the fixed or rigid spokes, Fig. 4 is a detail sectional view showing the manner of attaching a pair of the springs to the rim, and Fig. 5 is a detail sectional view through one of the buffer rollers, and immediately associated parts.

Referring more specifically to the drawings, wherein like reference characters designate the same parts in the several views, A represents the axle of a wheel, B the hub adapted to constitute the bearing for a complementary axle and coöperating elements ordinarily combined with an axle and not necessary to be illustrated in detail herein, C indicating the customary dust cap. The hub B, best seen in Fig. 2, is preferably of a two part construction, and conveniently of metal formation constructed integrally with similar two-part spokes D of transversely curved construction to render the same rigid and of adequate strength, the spokes radiating from the hub and being of proper number in consonance with standard wheel principles and requirements, the two parts of the spokes, and incidentally of the hub, being firmly united through the medium of bolts E.

Inasmuch as the outer ends of all of the spokes are alike, a detail description of one will suffice for them all, the peculiar formation of said ends now to be defined, being for advantageous purposes presently to appear.

As clearly shown in Fig. 3, the end of the spoke is enlarged to constitute a head F provided with a channel or opening running therethrough axially of the wheel to constitute a yoke G, having parallel side walls $g$ radially of the wheel connected by a rounded base $g'$, said yoke presenting its open end toward the periphery of the wheel. Projecting outwardly from the parallel side walls $g$ are two pairs of integral ears H separated to provide spaces $h$ therebetween bridged by pivot bolts or pins I. The ears are maintained in proper, spread relation by spacing sleeves $i$, having their ends abutting the inner faces of the ears and held against rotation by the impingement of said ends against such faces under the clamping action of the bolts I. Upon these spacing sleeves cylindrical bearing brasses $j$ are sleeved, around which one terminal $j'$ of oppositely disposed springs J are secured to be free to turn or swing to a slight extent, the side walls $g$ of the yoke extending outwardly a substantial distance beyond the bolts I to constitute reinforced backings or abutments $j^2$ for these terminals portions of the springs.

Having now described what may be termed the relatively fixed portions of the wheel, namely, its hub and rigid spokes, we may now further consider the manner of suspending these spokes in the rim, which also necessitates a special consideration of the component parts of the rim itself, the latter being a relatively displaceable or adjustable member of the wheel and which, with the mounting of their resilient means therewithin, in connection with said rigid spokes, is the salient characteristic of my improvements.

For the sake of convenience in assembling, the rim is formed of a plurality of segmental plates K adapted when brought into registration, to form circular side or face plates having a closed periphery L formed by abutting inturned integral flanges on the plates and held together by bolts $l$, said flanges being braced interiorly of the periphery, and the plates being correspondingly braced and held in proper spaced relation, by a continuous reinforcing filler ring M, in turn held in place by the aforesaid bolts $l$.

Projecting outwardly from the plates K and joined therewith approximately in line with the flanges L, are oppositely disposed tire-engaging and retaining flanges $m$ adapted to grip a rubber or other cushion tire N.

The filler ring or block M to which I above made mention, is scalloped on its inner face to form a continuous series of seats or cradles O around the wheel, the side K, of course, being shaped to conform to this configuration, but projecting inwardly slightly beyond the surface of the scalloped face and ribbed as at $p$ to embed in the opposite edges of, and fasten in place, a friction retainer or guide P projecting inwardly beyond the innermost edges of the plates K, so as not to be interfered with in its action by said plates. This frictional retainer or guide is preferably formed of rubber or similiar gripping material, and as seen to the right of Fig. 1, is in the nature of a strip following the scallops or cradles, and secured to the inner face of the filler ring M throughout the extent of the same. The ridge portion Q intermediate of each pair of cradles O projects inwardly radially of the wheel and is arranged,—one in each instance,—directly opposite the yoke formed in the end of the spoke D; and within such yoke, normally spaced therefrom at all points, is a rubber or equivalent buffer roller R adapted to roll within the yoke when the rim is displaced under the actuation of the wheel, and adapted to limit the extent of displacement of the rim, such buffer roll being supported upon brackets $r$ fastened against the outer faces of the plates K and by the bolts $l$, which secure the plates in place, and with their inner ends projecting a substantial distance radially inward beyond the ridge Q and the friction material passing thereover,—Fig. 1, the rolers R being immediately mounted in these brackets, at the free or extended portions thereof, in a manner similar to the fastening of the spring terminals Fig. 4, that is, a bolt $r'$ bridges the opening between the brackets and bears a spacing sleeve $r^2$ clamped between the brackets by the action of the bolt in acting to hold the brackets in their desired spaced relation, and the rubber roller R having a tubular brass lining or bearing $r^3$ adapted to revolve upon the spacing sleeve, as will be readily understood. It is needless to show the several independent bearings employed in the wheel, because their structure is the same in the various instances of the use. The ridge portions Q between any pair of cradles or seats O may be of some considerable breadth as shown, but the outer ridge portions S of each pair,—or looking at it form another view point, those ridge portions between the several pairs of cradles or seats,—are of greatly reduced cross-area, or relatively narrow (Fig. 1) for a purpose to be pointed out.

At the opposite faces of the wheel, overlying the ends of the ridge portions S, are a pair of brackets T bolted in place as at $t$, projecting inwardly radially beyond the ridges S and friction facing passing thereover, and having a T head $t'$, in which the adjacent ends of a pair of the springs J are mounted in the same manner as the mounting of the other ends of these springs, as hereinbefore discussed in connection with the headed ends of the spokes, and constituting the points of immediate suspension of the spokes in the rim.

In the case of both the brackets T and $r$, they are provided with enlarged outer ends or feet, as shown at U, to bear upon the tire gripping flanges $m$, whereby to better support the brackets against outward thrust, and the enlarged heads U are bolted at separated points as at $u$ through the plates K, to better secure the adjacent segmental plates against liability to open at their abutting edges.

By demonstration, I have found that to secure the most satisfactory results in the even distribution of forces around the rim of the wheel, and to prevent fracture or crystallization of the springs, the points of suspension of the spokes within the rim should be arranged in an arc concentric to the axis of the wheel, that is to say, the bearings of any pair of the springs J at their points of connection with the end of the spoke and their opposite ends in the brackets T are all arranged to be intersected by a line constituting an arc of a circle drawn from the center of the wheel. By this arrangement, it follows that the movement or displacement of the suspension means, within the limits allowed by the combination of parts, while free within those limits, in constantly within the rim, that is, outside of a straight line drawn to intersect the points of suspension for the outer ends of any two or pair of the springs J. This locates the ends of the fixed spokes within the rim under all conditions of service and absolutely prevents any compound bending of the springs, compelling them at all times to simply bow closer together, or spread further apart, as the case may be, in an approximately rolling action.

It is also to be further observed that those terminals of the bowed springs that are mounted in the brackets T, and which, as previously stated, constitute the particular points of suspension, bear at all times, to some extent upon the retaining and guiding strip P, while the opposite terminals (connected to the headed ends of the spokes) extend away from said friction surface P to permit of the desired substantial play or movement of the rim relative to the spokes to the degree circumscribed by the rubber buffers R. The result is that, as the wheel meets an obstruction and the rim is displaced and forced inwardly relative to the rigid spokes, the lower springs are spread longitudinally, and in a gradual progressive way, engage to increasing extents the retaining and guiding surfaces P, and commensurate with such engagement the strains and forces are relieved from the pivotal points and engaged portions of the springs on the brackets T, and taken up directly by the rim proper through the surface P, the latter gripping and guiding the springs throughout their movement, and preventing any lateral slipping, i. e.—axially of the wheel. Correspondingly the upper springs, tending to bow to a greater extent incident to the raising of the rim relative to the upper spoke ends, will exert a constant pressure peripherally of the wheel to restore themselves to normal position, and as a consequent of such pressure the springs at said upper portion of the wheel will also progressively engage the retaining and guiding surface, so that, all around the wheel the rim when displaced is not free to rebound with a jar or jerk, or to vibrate to any noticeable extent, but is held in all of its positions throughout its periphery, and permitted to automatically restore itself in an evenly balanced manner throughout the extent of the rim. Of course, the matter just considered deals primarily with a blow to the rim truly radially thereof, but approximately the same results flow from any action on the rim tending to displace it, those movements of the rim other than truly radial, being accommodated and taken up by the springs in a rolling of the springs in their cradles, and the buffers R in their yokes at the ends of the spokes, the latter, as already stated, serving the useful function of limiting the movement of the rim with reference to the fixed spokes to such a degree as will guarantee safety, and a permanent operating association of the displaceable rim with its fixed spokes.

The shape of the springs J is, as shown, somewhat greater than a half circle, and approximates a U-formation, but the branches or terminals are not sufficiently long to permit any compound or reverse curving of the spring, which compound or reverse curving has been found to prevent the use of a resilient wheel under high speeding conditions, because of their inability to promptly restore themselves in time to meet successive shocks; and it will be further noticed that the effective operating portion of my spring is in reality approximately a half circle, owing to the engagement thereof normally at one end with the retaining and guiding material P, and the backing up of the opposite terminal by the projecting portions or fingers $j^2$ of the yokes at the outer ends of the rigid spokes.

Many changes may be made in the details of the construction herein pointed out, as may meet particular conditions governing special embodiments of my invention, and while I have herein referred to my cradle and spring formation as embodied and especially useful in a wheel, it is recognized that the same may be used in other combinations, in which latter application or use I would not desire to be restricted other than as may be required by the express terms of the hereto appended claims, or the equivalents thereof.

Having thus described the invention, what I claim is:

1. A wheel having rigid spokes, a displaceable rim, and resilient suspending means for the outer ends of the spokes connected thereto at points within the said rim, said resilient means comprising oppositely disposed bowed springs connected at one end to the outer ends of the spokes and at the other end to a part of the rim, the rim having cradles upon which the springs may work, the ends of the springs remote from the spokes being adapted to initially engage the cradle, and when placed under pressure to gradually and progressively increase such engagement toward those ends of the springs connected to the spokes, in combination with ridge portions on the rim intermediate of the cradles normally facing radially the ends of the spokes, and buffer members supported by the rim adjacent the said ridges, the said ends of the spokes constituting yokes adapted normally to be free from said buffers but under pressure to be engaged thereby.

2. A wheel having rigid spokes, a displaceable rim, and resilient suspending means for the outer ends of the spokes connected thereto at points within the said rim, said resilient means comprising oppositely disposed bowed springs connected at one end to the outer ends of the spokes and at the other end to a part of the rim, the rim having cradles upon which the springs may work, said cradles having retaining and guiding means on the inner face thereof for the said springs, the ends of the springs remote from the spokes being adapted to initially engage the retaining and guiding means and when placed under pressure to gradually and progressively increase such engagement toward those ends of the springs connected to the spokes, in combination with ridge portions on the rim intermediate of the cradles normally facing radially the ends of the spokes, and buffer members supported by the rim adjacent the said ridges, the said ends of the spokes constituting yokes adapted to be normally free from said buffers but under pressure to be engaged thereby.

3. A wheel having rigid spokes, a displaceable rim, and resilient suspending means for the outer ends of the spokes connected thereto at points within the said rim, said resilient means comprising oppositely disposed bowed springs connected at one end to the outer ends of the spokes and at the other end to a part of the rim, the rim having cradles upon which the springs may work, the ends of the springs remote from the spokes being adapted to initially engage the cradle, and when placed under pressure to gradually and progressively increase such engagement toward those ends of the springs connected to the spokes, in combination with buffer members supported by the rim at points intermediate of the cradles, and normally arranged radially in line with the ends of the spokes, said ends of the spokes constituting yokes adapted normally to be free from said buffers but under pressure to be engaged thereby.

4. A wheel having rigid spokes, a displaceable rim, and resilient suspending means for the outer ends of the spokes connected thereto at points within the said rim, said resilient means comprising oppositely disposed bowed springs connected at one end to the outer ends of the spokes and at the other end to a part of the rim, the rim having cradles upon which the springs may work, said cradles having retaining and guiding means on the inner face thereof for the said springs, the ends of the springs remote from the spokes being adapted to initially engage the retaining and guiding means and when placed under pressure to gradually and progressively increase such engagement toward those ends of the springs connected to the spokes, in combination with buffer members supported by the rim at points intermediate of the cradles, and normally arranged radially in line with the ends of the spokes, said ends of the spokes constituting yokes adapted normally to be free from said buffers but under pressure to be engaged thereby.

5. A wheel having rigid spokes, a displaceable rim, and resilient suspending means for the outer ends of the spokes connected thereto at points within the said rim, said resilient means comprising oppositely disposed bowed springs connected at one end to the outer ends of the spokes and at the other end to a part of the rim, the rim having cradles upon which the springs may work, the ends of the springs remote from the spokes being adapted to initially engage the cradle, and when placed under pressure to gradually and progressively increase such engagement toward those ends of the springs connected to the spokes, in combination with elastic buffer rollers supported by the rim at points intermediate of the cradles, and normally arranged radially in line with the ends of the spokes, said ends of the spokes constituting yokes adapted normally to be free from said buffers but under pressure to be engaged thereby.

6. A wheel having rigid spokes, a displaceable rim, and resilient suspending means for the outer ends of the spokes connected thereto at points within the said rim, said resilient means comprising oppositely disposed bowed springs connected at one end to the outer ends of the spokes and at the other end to a part of the rim, the rim having cradles upon which the springs may work, said cradles having retaining and guiding means on the inner face thereof for the said springs, the ends of the springs remote from the spokes being adapted to initially engage the retaining and guiding means and when placed under pressure to gradually and progressively increase such engagement toward those ends of the springs connected to the spokes, in combination with elastic buffer rollers supported by the rim at points intermediate of the cradles, and normally arranged radially in line with the ends of the spokes, said ends of the spokes constituting yokes adapted normally to be free from said buffers but under pressure to be engaged thereby.

7. A wheel having a hub, spokes, rim, and resilient means for engaging the outer ends of the spokes permitting displacement of the rim relative to the spokes, said means including a pair of spaced members, a bolt bridging the space between said members, a spacing sleeve held in place with its ends engaging the inner faces of said members by said bolt, and a rotatable bearing on said spacing sleeve.

8. A wheel having rigid spokes, a rim, and resilient suspending means for the outer ends of the spokes connected thereto and to parts of the rim, said means including oppositely disposed bowed springs, and cradles formed in the rim arranged so that pressure applied at any of the springs will distribute the force of impact throughout the other springs around the rim by effecting an increasing surface engagement of the springs with their respective cradles, in combination with abutting portions disposed between the springs arranged to contact under abnormal pressure with the ends of the spokes.

9. A wheel having rigid spokes formed with yokes at their outer ends, a rim, abutments on the rim adapted to engage the outer ends of the spokes under abnormal displacement of the rim, and yieldable suspension devices in the rim for said spokes connected to the rim and to the spokes to permit a rolling action of the rim within the said yokes, substantially as described.

10. A wheel having rigid spokes formed with yokes at their outer ends, a rim, roller abutments on the rim adapted to engage the outer ends of the spokes under abnormal displacement of the rim, and yieldable suspension devices in the rim for said spokes connected to the rim and to the spokes to permit a rolling action of the rim within the said yokes, substantially as described.

11. A wheel having a hub and rigid spokes provided with yokes at their outer ends, a rim having a scalloped inner surface constituting cradles, retaining and guiding means in said cradles, oppositely disposed bowed springs connected at one end to parts of the rim and at their other ends to the ends of the spokes, and buffer members on the rim intermediate of said cradles normally free from but adapted to engage the surface of said yokes.

12. A wheel having a hub and rigid spokes provided with yokes at their outer ends, a rim having a scalloped inner surface constituting cradles, retaining and guiding means in said cradles, oppositely disposed bowed springs connected at one end to parts of the rim and at their other ends to the ends of the spokes, and buffer members on the rim intermediate of said cradles normally free from but adapted to engage the surface of said yokes, the points of suspension of the springs being in an arc concentric to the axis of the wheel.

13. A wheel having a hub and rigid spokes provided with yokes at their outer ends, a rim having a scalloped inner surface constituting cradles, retaining and guiding means in said cradles, oppositely disposed bowed springs connected at one end to parts of the rim and at their other ends to the ends of the spokes, and buffer members on the rim intermediate of said cradles normally free from but adapted to engage the surface of said yokes, the points of suspension of the springs being in an arc concentric to the axis of the wheel, and the springs being arranged to initially engage the retaining and guiding means adjacent to their point of attachment to the rim and to progressively increase such engagement along the spring as increased pressure is applied to the rim.

14. A wheel having a hub and rigid spokes provided with yokes at their outer ends, a rim having a scalloped inner surface constituting cradles, retaining and guiding means in said cradles, oppositely disposed bowed springs connected at one end to parts of the rim and at their other ends to the ends of the spokes, and buffer members on the rim intermediate of said cradles normally free from but adapted to engage the surface of said yokes, the points of suspension of the springs being in an arc concentric to the axis of the wheel, and the springs being arranged to initially engage the retaining and guiding means adjacent to their point of attachment to the rim and to progressively increase such engagement along the spring as increased pressure is applied to the rim, the spokes being provided with reinforcing projections adjacent to the yoke portions thereof to back up the end portions of the springs.

15. In a resilient vehicle wheel, the combination with a hub, and spoke members radiating from the hub, of springs extending from the outer ends of the spoke members, said springs being curved from the spoke members and having their outer ends connected in pairs, a rim surrounding the spoke members and having recesses shaped to receive the springs which normally stand out of the recesses, members rigidly connecting the connected ends of the springs with the rim, and buffer rollers carried by the rim and positioned between the springs at their points of connection with the spoke members.

16. In a vehicle wheel, means for yieldably suspending a part thereof comprising a pair of curved cradles, an opposing rigid member toward and from which the cradles move, and bowed springs connected at one end to said rigid member and at the opposite end to parts attached to the cradles, said springs being arranged to engage in a gradually increasing surface contact lengthwise thereof with the cradles, in combination with a buffer member arranged intermediate of the cradle and adapted to contact and play over the end of the fixed member.

17. In a vehicle wheel, means for yieldably suspending a part thereof comprising a pair of curved cradles, an opposing rigid member toward and from which the cradles move, and bowed springs connected at one end to said rigid member and at the opposite end to parts attached to the cradles, said springs being arranged to engage in a gradually increasing surface contact lengthwise thereof with the cradles, the end of the fixed member being located within a plane bounded by a line intersecting the outermost points of suspension of the spring, in combination with a buffer member arranged intermediate of the cradles and adapted to contact and play over the end of the fixed member.

In testimony whereof I affix my signature in presence of two witnesses.

WALTER E. ROBERTSON.

Witnesses:
H. N. RAMSEY,
E. F. RILY.